(12) United States Patent
Wall et al.

(10) Patent No.: US 8,289,339 B2
(45) Date of Patent: Oct. 16, 2012

(54) METHOD, APPARATUS AND COMPUTER PROGRAM PRODUCT FOR ENHANCED RADAR VIDEO PROCESSING

(75) Inventors: Mathew D. Wall, Barboursville, VA (US); Thomas G. Beazell, Charlottesville, VA (US); Chris Hayes, New Malden (GB)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1137 days.

(21) Appl. No.: 12/116,042

(22) Filed: May 6, 2008

(65) Prior Publication Data
US 2009/0322776 A1    Dec. 31, 2009

Related U.S. Application Data

(60) Provisional application No. 60/953,348, filed on Aug. 1, 2007.

(51) Int. Cl.
*G06T 11/40* (2006.01)

(52) U.S. Cl. .................................................... 345/552
(58) Field of Classification Search .......... 345/582–588, 345/552, 672–688
See application file for complete search history.

(56) References Cited

U.S. PATENT DOCUMENTS

| | | | | |
|---|---|---|---|---|
| 5,461,712 | A * | 10/1995 | Chelstowski et al. | 345/543 |
| 5,923,285 | A * | 7/1999 | Andrusiak et al. | 342/177 |
| 2003/0174136 | A1* | 9/2003 | Emberling et al. | 345/531 |
| 2004/0075663 | A1* | 4/2004 | Plante | 345/474 |
| 2005/0164147 | A1* | 7/2005 | Legan | 434/2 |

* cited by examiner

*Primary Examiner* — Aaron M Richer
(74) *Attorney, Agent, or Firm* — Alston & Bird LLP

(57) ABSTRACT

An apparatus for providing enhanced radar video processing may include a processing element. The processing element may be configured to receive, from a state table that is oriented in a fixed orientation, data based on a radar return, to store a texture corresponding to an image based on the received data, the texture being oriented with respect to a center of a radar sweep, to define a plurality of adjacent vertex buffers, and to map the texture to at least one of the vertex buffers in which portions of the texture are capable of being scrambled within at least one of the vertex buffers.

21 Claims, 13 Drawing Sheets

METHOD, APPARATUS AND COMPUTER PROGRAM PRODUCT FOR ENHANCED RADAR VIDEO PROCESSING

CROSS REFERENCE TO RELATED APPLICATION

This application claims the benefit of U.S. Provisional Application No. 60/953,348, filed Aug. 1, 2007, the contents of which are incorporated herein in their entirety.

FIELD OF THE INVENTION

Embodiments of the present invention relate generally to video processing, and more particularly, to providing a method, system and computer program product for enabling enhanced radar video processing.

BACKGROUND OF THE INVENTION

Radar has long been employed in applications such as air traffic control, fire control, navigation, etc. Due to the many advantages of radar usage in such applications, radar has also been the subject of continuous improvement efforts. As such, for example, digital technology has been developed for use in connection with radar displays. However, certain aspects of older radar technology, such as a long persistence phosphor display to show trails of objects detected via radar, may be desirable for continued use. In this regard, for example, the persistence of the phosphor display enabled operators to see trail data indicative of an object's motion relative to the radar antenna providing the origin for return data. Accordingly, digital video processing techniques have been developed to emulate the long persistence phosphor display. In this regard, previous techniques introduced scan converter hardware for the processing of radar data and the production of a radar image displayed to the radar operator. The scan converter hardware converted analog signals representing radar return data into a final displayable image by first converting analog signals to digital values representing the distance and bearing of a return. A state table was then utilized to store video buildup and trail information based on the digital values. The state table information was then processed for fading video buildup and decaying trails. The state table was then mapped into colors to represent visual trails and video buildup and the color information was written to a video card for display to the operator.

The scan converter described above proved useful in providing many desirable radar display characteristics such as enabling trails and video buildup to be displayed representative of historical return data over a period of time. However, the scan converter described above also included several limitations. In this regard, one limitation of the above described scan converter was that the displayed video image could not be reoriented without losing video buildup and trails. For example, if the radar display was to be shifted from a head up mode, in which the heading of the ship employing the radar is oriented to the top of the display, to a North up mode, in which true North is oriented to the top of the display, then the state table, which recorded data oriented in the same manner as the data was to be displayed, would be cleared and video buildup and trail history data would be lost. Accordingly, for example, it would not be possible to maintain trail history for stabilized head up operation, which may require continuous reorientation of the image based on changes in the heading of the ship.

Another limitation of a prior art scan converter is that repositioning of a video image to support RM(T) operation yields distracting artifacts. RM(T) operation provides for display of relative motion and true trails. Relative motion refers to a mode of operation in which the video origin remains stationary on the display and return data from surrounding objects (e.g., buoys, other ships, coast lines, etc.) move on the display relative to the stationary video origin. True trails refers to a mode of operation in which the trail left behind by target returns will grow at a rate proportional to the object's (or target's) true speed over ground. When attempting to generate true trails, digitized video return data is stored in a state table having a mapping of state table coordinates to real world ground plane coordinates that is constant. However, as a ship moves over the ground plane, the coordinates of the video origin in the state table must move correspondingly. In order to maintain the video origin stationary on the display in relative motion mode, a continuous shift in the mapping between the state table and the display is required. Due to the limited bandwidth of the bus providing platform communication, there cannot be an instantaneous transfer of all the data for adjustment of mapping to accommodate the shift. Thus, only a portion of the data is transferred in a pseudo random fashion so that the display updates gradually rather than instantaneously. The gradual update causes an undesirable pixel twinkle effect that represents a distracting artifact to the user.

An inability to support true motion with relative trails mode (TM(R)) and an inability to provide instantaneous video image offset are additional shortcomings of prior art scan converters. Accordingly, it may be desirable to provide enhanced radar video processing that may overcome at least some of the disadvantages described above.

BRIEF SUMMARY OF THE INVENTION

Embodiments of the present invention provide a method, computer program product and apparatus for providing enhanced radar video processing. In this regard, a video texture may be mapped to a plurality of vertex buffers. The video texture may be maintained in a constant orientation due to the fixed orientation of the state table storing state values used in generation of the video image corresponding to the texture. A viewport may then be defined to provide a portion of the texture for rendering at a display. The viewport may then be oriented and/or offset as desired, without a need to clear the state table. Thus, trail information may not be lost and other effects may be achieved since the state table need not be cleared in response to operations that would otherwise require clearing of the state table in conventional mechanisms.

In one exemplary embodiment, a method of providing enhanced radar video processing is provided. The method may include receiving, from a state table that is oriented in a fixed orientation, data based on a radar return and storing a texture corresponding to an image based on the received data. The texture may be oriented with respect to a center of a radar sweep. The method may further include defining a plurality of adjacent vertex buffers, and mapping the texture to at least one of the vertex buffers in which portions of the texture are scrambled within at least one of the vertex buffers.

In another exemplary embodiment, a computer program product for providing enhanced radar video processing is provided. The computer program product may include at least one computer-readable storage medium having computer-readable program code portions stored therein. The computer-readable program code portions may include a first executable portion, a second executable portion, a third executable portion and a fourth executable portion. The first executable portion may be for receiving, from a state table that is oriented in a fixed orientation, data based on a radar return. The second executable portion may be for storing a texture corresponding to an image based on the received data. The texture may be oriented with respect to a center of a radar sweep. The third executable portion may be for defining a plurality of adjacent vertex buffers. The fourth executable portion may be for mapping the texture to at least one of the vertex buffers in which portions of the texture are capable of being scrambled within at least one of the vertex buffers.

In another exemplary embodiment, an apparatus for providing enhanced radar video processing is provided. The apparatus may include a processing element. The processing element may be configured to receive, from a state table that is oriented in a fixed orientation, data based on a radar return, to store a texture corresponding to an image based on the received data, the texture being oriented with respect to a center of a radar sweep, to define a plurality of adjacent vertex buffers, and to map the texture to at least one of the vertex buffers in which portions of the texture are capable of being scrambled within at least one of the vertex buffers.

Embodiments of the invention may provide an enhanced ability to provide instantaneous changes in orientation and/or offset of image data displayed without losing buildup and trail information. As a result, radar display capabilities may be enhanced.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
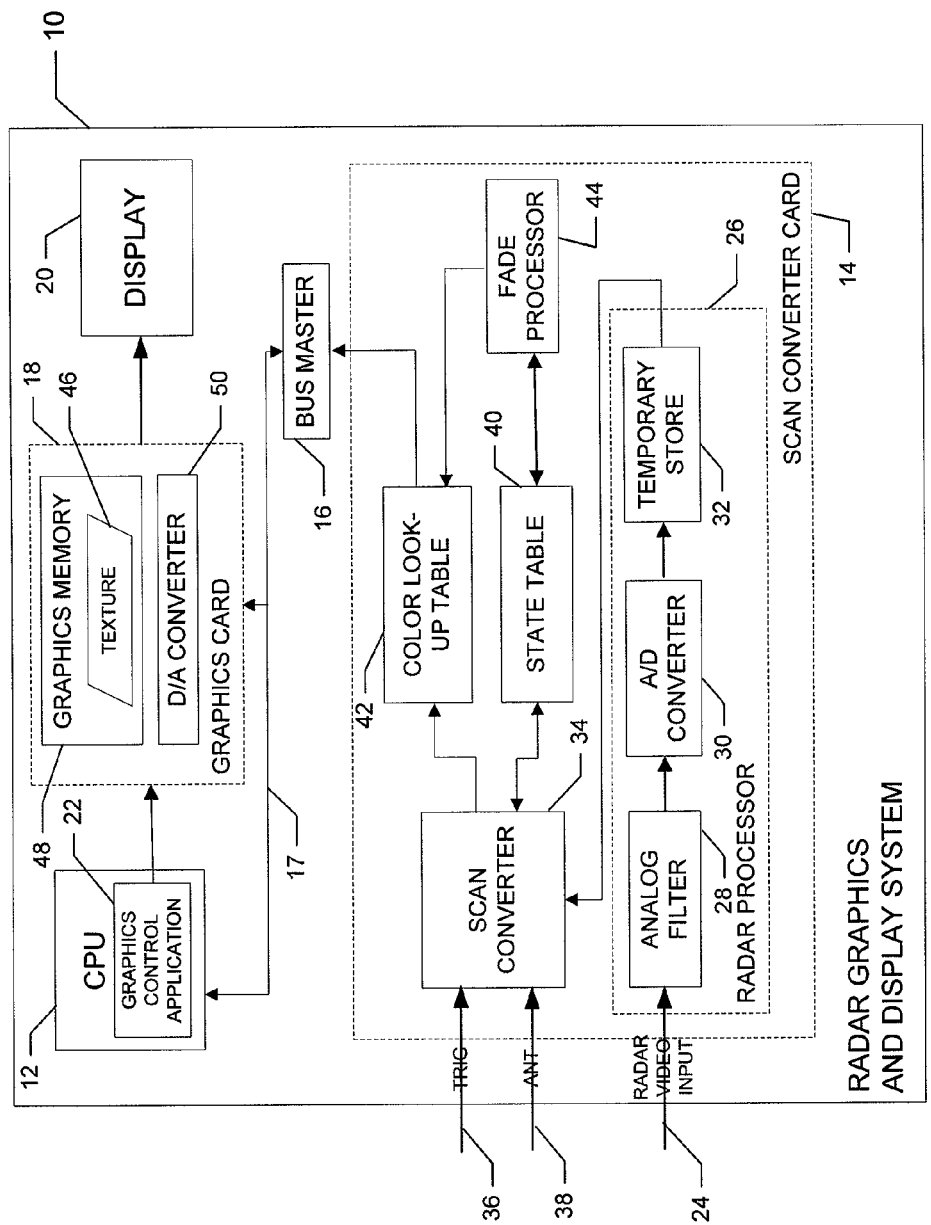
FIG. 1 is a diagram illustrating an exemplary radar graphic and display system according to an exemplary embodiment of the present invention.

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like reference numerals refer to like elements throughout.

FIG. 1 is a diagram illustrating an exemplary radar graphics and display system 10. As shown in FIG. 1, the radar graphics and display system 10 may include a central processing unit (CPU) 12 or other processing element in communication with a scan converter card 14 via a bus master 16, which may provide a connection between numerous cards and/or modules and a bus 17 in communication with the CPU 12 to enable the CPU 12 to control or coordinate communications between the cards and/or modules. The CPU 12 may also be in communication with a graphics card 18, which may include its own processing element (e.g., a graphics processing unit (GPU)) for presenting selected image data processed at the graphics card 18 to be rendered at a display 20. A processing element as described herein (e.g., the CPU 12) may be embodied in a number of different ways. For example, the processing element may be embodied as a processor, a coprocessor, a controller or various other processing means or devices including integrated circuits such as, for example, an ASIC (application specific integrated circuit). In an exemplary embodiment, the processing element may be configured to execute instructions stored in a memory device or otherwise accessible to the processing element. For example, the CPU 12 may execute software programs such as a graphics control application 22 which may be stored in memory accessible to the CPU 12 and may be executed in order to control the GPU of the graphics card 18. As such, the graphics control application 22 may control or parameterize the graphics card 18 to instruct the graphics card 18 with respect to presenting image data for rendering at the display 20, or at a sub-region of the display. The display 20 may be any suitable display such as, for example, a liquid crystal display (LCD) or a cathode ray tube (CRT) display. Alternatively, a display need not be present as the system may simply record data to a file for playback at a later time.

In an exemplary embodiment, either or both of the graphics card 18 and the scan converter card 14 may be any device or means (or combination of devices and means) embodied in hardware, software or a combination of hardware and software that is configured to perform the corresponding functions associated with the graphics card 18 and the scan converter card 14, respectively, as described below. In this regard, the graphics card 18 may be configured to map a texture to a plurality of vertex buffers in order to enable presentation of a display that is oriented, scaled and/or offset according to operator desires, without the loss of buildup and/or trail data. The scan converter card 14 may be configured to provide digital information corresponding to image data from radar video input into the system for use by the graphics card 18 as described above. Moreover, the scan converter card 14 may be configured to maintain the digital information in a fixed orientation regardless of the orientation desired for display.

In an exemplary embodiment, the scan converter card 14 may be configured to receive a radar video input 24 in analog form at a radar processor 26. The radar processor 26 may be configured to perform digital video processing. In this regard, the radar processor 26 may include an analog filter 28. After filtering the radar video input 24 at the analog filter 28, the filtered data may be converted from analog data to a digital data stream by an analog-to-digital (A/D) converter 30. The converted digital data stream beginning with a synchronizing trigger signal 36 may then be stored temporarily at a memory device such as a temporary store 32. The temporary store 32 may store sample data for a single value of theta and all values of rho over an entire radar range sweep. Data from the temporary store 32 may then be communicated to a scan converter 34, which may also be configured to receive an antenna pointing direction signal 38. The scan converter 34 may be configured to convert data from a rho-theta format to an X-Y coordinate address or location. In this regard, rho (range) may be determined by time from the trigger to receipt of a return while theta (azimuth) may be obtained from the antenna pointing direction signal 38 that may be coupled to an antenna drive system. As such, the scan converter 34 places each digital sample received from the radar processor 26 in a proper position in a state table 40.

The state table 40 may be maintained in a memory device and may store data in X-Y coordinate locations oriented in a fixed manner. In this regard, as indicated above, conventional mechanisms stored state table information in an orientation corresponding to a selected display orientation. Conventional mechanisms also store the state table such that the offset corresponds to the selected display offset. In other words, for example, if the video center is offset to the left of the display, the data in the state table must be offset to the left as well to produce this effect. However, the state table 40 of embodiments of the present invention may overcome these disadvantages. In this regard, for example, the state table 40 of embodiments of the present invention may maintain a fixed orientation such as, for example, a North up orientation. The state table 40 may store state value data comprising the X-Y coordinate locations of radar returns. Furthermore, the state value data may account for build up and trail related information since the state value may include, not only for data related to a current scan for a particular X-Y coordinate location, but also prior scans. The state table 40 may also be in communication with, for example, a color look-up table 42 and/or a fade processor 44. The color look-up table 42 may receive the state value either directly, or as modified by the fade processor 44 and may map or otherwise determine a color corresponding to the state value. The fade processor 44 may modify state value information after each subsequent scan to provide a fading effect for older data. The modified state value (e.g., a state value decremented for each subsequent scan) may then be stored to replace its corresponding state value in the state table 40 and/or communicated to the color look-up table 42 to determine a corresponding color applicable to the modified state value.

In an exemplary embodiment, an output of the color look-up table 42 may be a pixel by pixel digital description of an image based on the radar return data received in the radar video input 24. The pixel by pixel digital description may be communicated to the graphics card 18 via the bus master 16 and the bus 17. The graphics card 18 may include a graphics memory 48 and a digital-to-analog (D/A) converter 50. Under the control of the graphics control application 22, the graphics card 18 may be configured to define a texture 46 including and/or based on the pixel by pixel digital description of the image received from the scan converter card 14. The texture 46 may be stored in the graphics memory 48, which may also include back buffered memory and/or a plurality of vertex buffers. In an exemplary embodiment, the graphics card 18 may be further configured to map the texture 46 to each of the vertex buffers in a manner described in greater detail below. The D/A converter 50 may convert digital data comprising at least a portion of the texture 46 into analog data for rendering at the display 20.

According to exemplary embodiments of the present invention, by mapping the texture 46 to the vertex buffers as described below, the GPU of the graphics card 18 may be configured to enable the rendering of a portion of the texture 46 defining a viewport 52 (see FIG. 4) having a variable orientation. The viewport 52 may also or alternatively present image data that is scaled and/or offset according to operator desires. Accordingly, the graphics card 18, under control of the graphics control application 22, may be configured to apply rotation and translation operations with respect to rendering information of the texture 46 to improve capabilities of embodiments of the present invention over conventional mechanisms with respect to providing image rotation without losing trail or video buildup history, data presentation in a stabilized head up mode including true trails, improved image quality with regard to true trail video generation in relative motion without artifacts, true motion relative trails without the artifacts described above for relative motion true trails, offsetting video without losing trails or video buildup history, and other radar performance gains.

As indicated above, one difference between embodiments of the present invention and conventional techniques relates to the fact that video processing that occurs at the graphics card 18, under control of the graphics application 22, provides orientation of data rendered at the display 20. Accordingly, the scan converter card 14 may process data in a fixed orientation. Thus, rather than storing data in the state table 40 in the same orientation as the desired display orientation, which would require clearing of the state table anytime orientation is changed and thereby the loss of trails and buildup data, embodiments of the present invention may maintain the state table 40 in oriented North up (or in any other predefined orientation). Thus, no matter what orientation is desired at the display 20, the scan converter card 14 need not clear the state table 40 merely due to desired changes in orientation. Additionally, offset and scale may also be altered without clearing the state table.

For each state table entry the scan converter card 14 may translate the corresponding state value into color data (e.g., at the color look-up table 42) and write the color data to the texture 46 on the graphics card 18. In an exemplary embodiment, the texture 46 and the state table 40 may have equal sizes. An orientation of the video image represented on the texture 46 may be North up, as in the state table 40. As such, there is no translation of the video image when transferred from the state table 40 to the texture 46, even if display orientation is changed. Accordingly, digitized video returns are stored in a state table having a mapping of state table coordinates to real world ground plane coordinates that is constant.

However, if a radar system employing an embodiment of the present invention is mounted on a moving platform such as, for example, a ship, the motion of the ship may alter the state table coordinates of the origin of the video image (e.g., the antenna forming the origin with respect to the radar return data). Accordingly, with respect to the coordinates of the state table, the video center for the ship will travel across the state table 40. Because the state table 40 is finite in size, the state table 40 may be employed as a sort of 2 dimensional circular buffer in order to "wrap" state table information to account for the motion of the ship. For example, as the center of the sweep (as determined by the motion of the ship) moves to the right, the left side of the state table 40 may be used to store video return state information that would otherwise be stored farthest to the right with respect to the center of the sweep. The same idea applies to the top and bottom of the state table 40. In this regard, if the ship approaches the bottom of the state table 40, state information that would otherwise be stored farthest from the center of the sweep at the bottom of the state table 40 (e.g., data equal in distance from the bottom edge of the state table 40 to the amount of movement of the center of the sweep toward the bottom edge of the state table 40) may be stored farthest to the top of the state table 40 with respect to the center of the sweep.

Figures 2A, 2B:
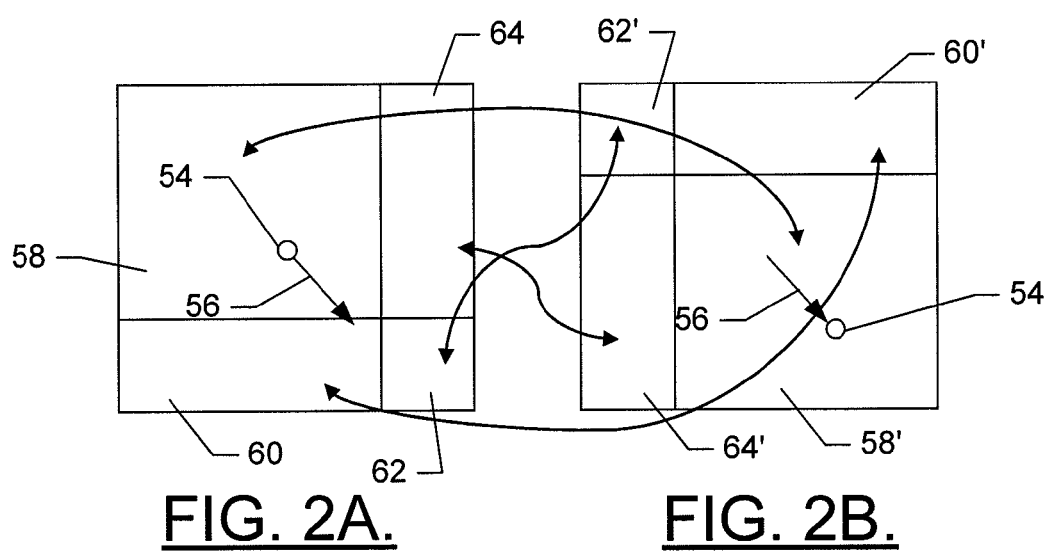
FIG. 2 illustrates an example of wrapping of state table information according to an exemplary embodiment of the present invention.

FIG. 2 illustrates an example of wrapping of state table information according to an embodiment of the present invention. As shown in FIG. 2A, an origin of the radar return (i.e., center of the sweep 54) may initially be in a center of the state table 40. However, as the center of the sweep 54 moves, for example, downward and to the right with respect to the state table coordinates as indicated by arrow 56, portions of the state table information may not be able to be stored in a continuous fashion. Accordingly, such portions may be wrapped as indicated in FIG. 2B. In this regard, the state table 40 may store state table values for a predetermined distance from the center of the sweep 54. As motion of the ship offsets the center of the sweep 54 from the center of the state table 40, state table values may be replaced accordingly. Thus, state table values may be replaced in accordance with the motion of the ship and state table values that are displaced from one edge may be wrapped to a corresponding opposite edge. Thus, state table values in a first portion 58 of the state table 40 in FIG. 2A may be wrapped to a corresponding first portion 58' in FIG. 2B. Likewise, state table values in a second portion 60, a third portion 62, and a fourth portion 64 of the state table 40 in FIG. 2A may be wrapped to positions of a corresponding second portion 60', a corresponding third portion 62' and a corresponding fourth portion 64', respectively, in FIG. 2B, to thereby create a scrambled version of the values in FIG. 2B with respect to the corresponding values of FIG. 2A.

Figure 3:
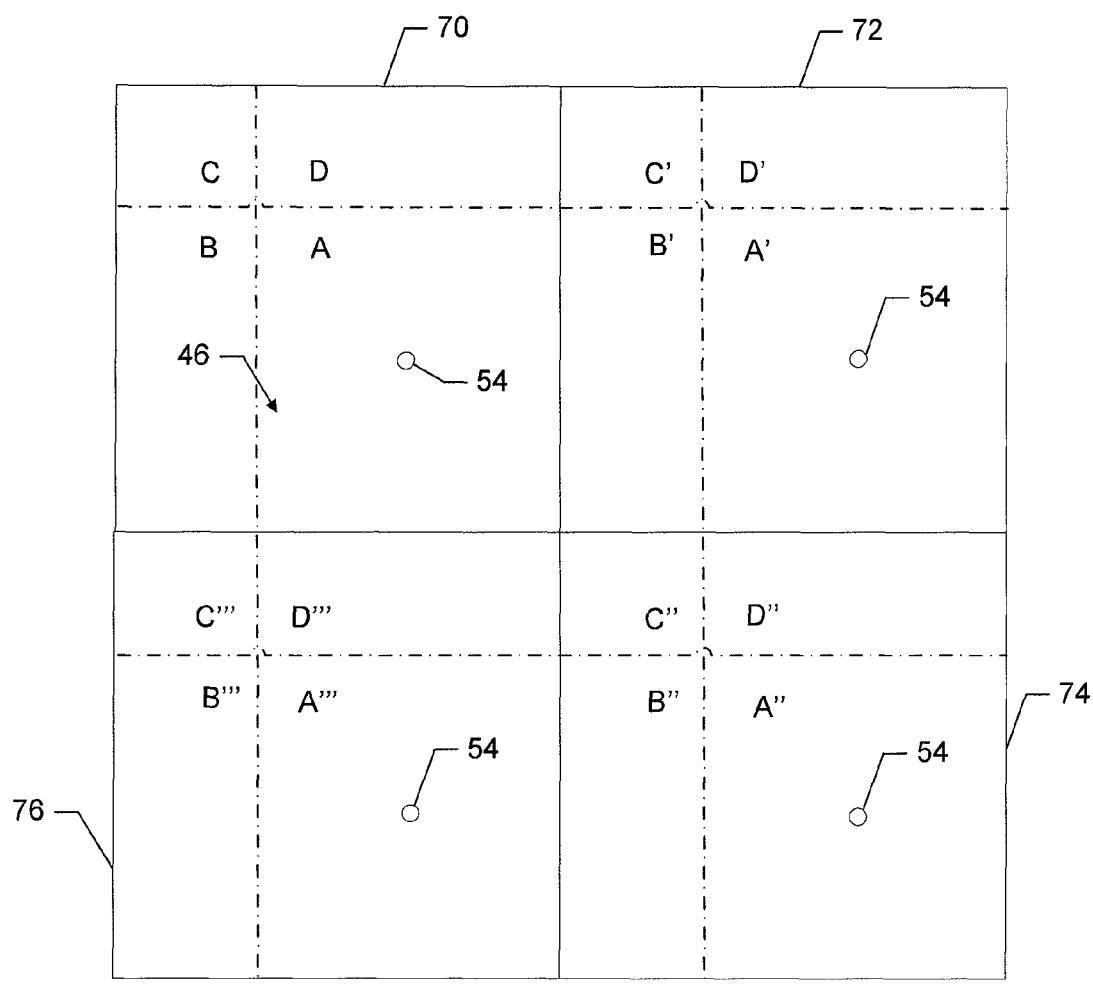
FIG. 3 illustrates an example of the mapping of a texture to a plurality of vertex buffers according to an exemplary embodiment of the present invention.

A vertex buffer may be defined as an array of coordinates used to specify where a texture is to be rendered. In an exemplary embodiment, the specification of a vertex buffer does not necessarily result in an allocation of memory for storage of a texture. Thus, defining a plurality of vertex buffers may not result in excessive memory usage. The vertex buffers could be defined to have any desirable shape. In an exemplary embodiment, four vertex buffers may be defined such that each vertex buffer defines a rectangle of size equal to a size of the texture 46 as shown in FIG. 3. In this regard, the size of the texture 46 may be defined by an accumulation of the wrapped portions of the texture 46. As such, when the texture 46 is rendered to the vertex buffers, the texture 46 may be repeated four times corresponding to each of the four respective vertex buffers, which include a first vertex buffer 70, a second vertex buffer 72, a third vertex buffer 74 and a fourth vertex buffer 76. In this example, the four vertex buffers are each square in shape and are themselves arranged in a 2×2 matrix to form a square.

When a video texture (e.g., the texture 46) is rendered to the vertex buffers, movement of the origin of the radar return (i.e., movement of the center of the sweep 54) may be accounted for by wrapping the texture 46 within each vertex buffer similar to the manner in which state values are wrapped in the state table as described above in reference to FIG. 2. Accordingly, the wrapping of a texture in a vertex buffer may correspond to the wrapping of state values in the state table. As shown in FIG. 3, if the texture 46 initially corresponds to the state table values of FIG. 2B, the texture 46 as mapped in the first vertex buffer 70 may comprise four portions including portion A, portion B, portion C and portion D, each of which corresponds to the respective first portion 58', the second portion 60', the third portion 62' and the fourth portion 64' of FIG. 2B. As also shown in FIG. 3, the texture 46 may be repeated three more times such that the texture 46 is mapped to each vertex buffer. Thus, the second vertex buffer 72 may include portion A', portion B', portion C' and portion D', which correspond to portion A, portion B, portion C and portion D, respectively, of the first vertex buffer 70. Similarly, the third vertex buffer 74 may include portion A'', portion B'', portion C'' and portion D'', which correspond to portion A, portion B, portion C and portion D, respectively, of the first vertex buffer 70 and the fourth vertex buffer 76 may include portion A''', portion B''', portion C''' and portion D''', which correspond to portion A, portion B, portion C and portion D, respectively, of the first vertex buffer 70.

As may be appreciated from FIG. 3, although within each vertex buffer the portions of the texture 46 may be wrapped such that the image corresponding to the texture 46 may be considered scrambled, a complete and unscrambled version of the texture 46 may be realized by considering portions of the texture 46 from the adjacent vertex buffers. For example, a complete and unscrambled version of the texture 46 may be realized by considering portion A of the first vertex buffer 70, portion B' of the second vertex buffer 72, portion C'' of the third vertex buffer 74 and portion D''' of the fourth vertex buffer 76.

Figure 4:
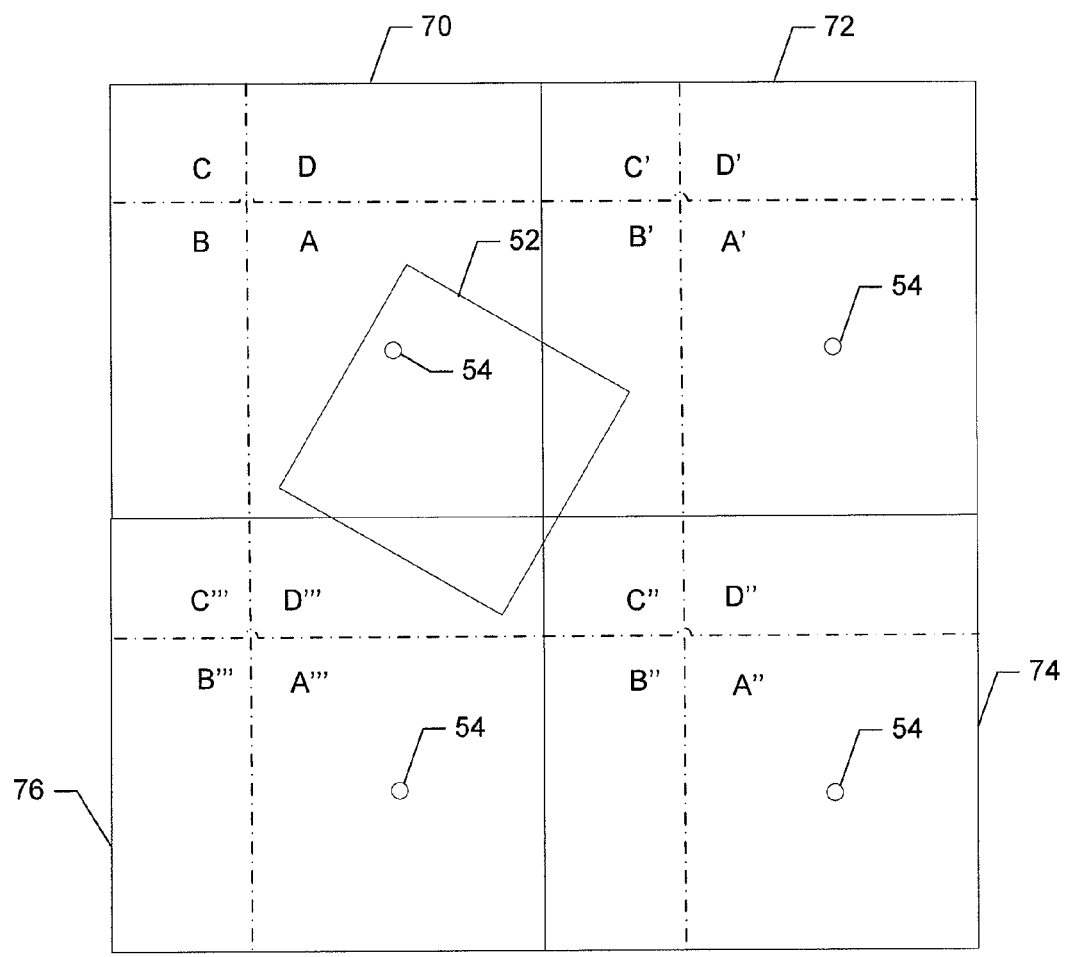
FIG. 4 illustrates an example of defining a viewport according to an exemplary embodiment of the present invention.

FIG. 4 illustrates an example of defining a viewport 52 according to an exemplary embodiment of the present invention. The viewport 52 may be specified to define what gets displayed to the screen. In other words, image data corresponding to the portion of the texture 46 that is within the viewport 52 may be processed by the GPU of the graphics card for rendering at the display 20. Edges of the viewport 52 (i.e., top, left, right and bottom) may correspond to respective edges of the display 20 (or to edges of a sub-region of the display). Since only the portion of the texture 46 within the defined viewport is communicated to the display for rendering, inefficiency is avoided since there is no need to process the entire texture four times over. Rather only those portions of the texture 46 within the defined viewport 52 may be processed for rendering. In an exemplary embodiment, a mask of any shape may be provided in connection with the viewport 52 in order to format content within the viewport 52 for a desired shape of the image rendered at the display 20. Thus, for example, a traditional circular shaped radar display may be presented. Of note, as indicated in FIG. 4, the defined viewport 52 may extend over the boundaries of the vertex buffers. However, despite passing over the boundaries of the vertex buffers, the viewport 52 may still define a portion of a complete and unscrambled version of the texture 46 (perhaps comprising portions of the texture 46 from different vertex buffers) for rendering.

By defining the viewport 52 with respect to the vertex buffers as shown in FIG. 4, many desired effects can be achieved. For example, rotation (which changes the orientation of the radar video output to the display), offset (which changes the center of the radar video output relative to the edge of the display) of the viewport 52 and/or scaling may be accomplished. In this regard, for example, the viewport 52 could be oriented with a ship's heading to provide a stabilized head up display. Alternatively, the viewport 52 could be oriented with North up, or any other desired orientation, without altering the texture 46 itself (or the corresponding state table) thereby enabling the preservation of buildup and trail information despite changing orientation of the display. Offsetting the viewport 52 may be accomplished by moving the video center (i.e., moving the center of the viewport 52) relative to the center of the sweep 54. However, in an exemplary embodiment, a limit may be placed on how far the video center may be offset from the center of the sweep 54 in order to ensure that a minimum amount of data is displayed on all sides of the center of the sweep 54 for safety purposes.

As indicated in FIG. 4, placing the viewport 52 so that the viewport 52 spans multiple vertex buffers effectively unwraps the image that has been tiled or scrambled by virtue of the wrapping that may occur over time within each individual vertex buffer. To support rotation and moving the video center about the display, in an exemplary embodiment the dimensions of the texture 46 may be larger than the dimensions of the viewport 52.

As an alternative to defining four vertex buffers equal in size to the texture 46 (which results in an area four times the video texture), the size of the vertex buffers can be dynamic such that the total area defined by the vertex buffers never exceeds the size of the video texture.

Figure 5:
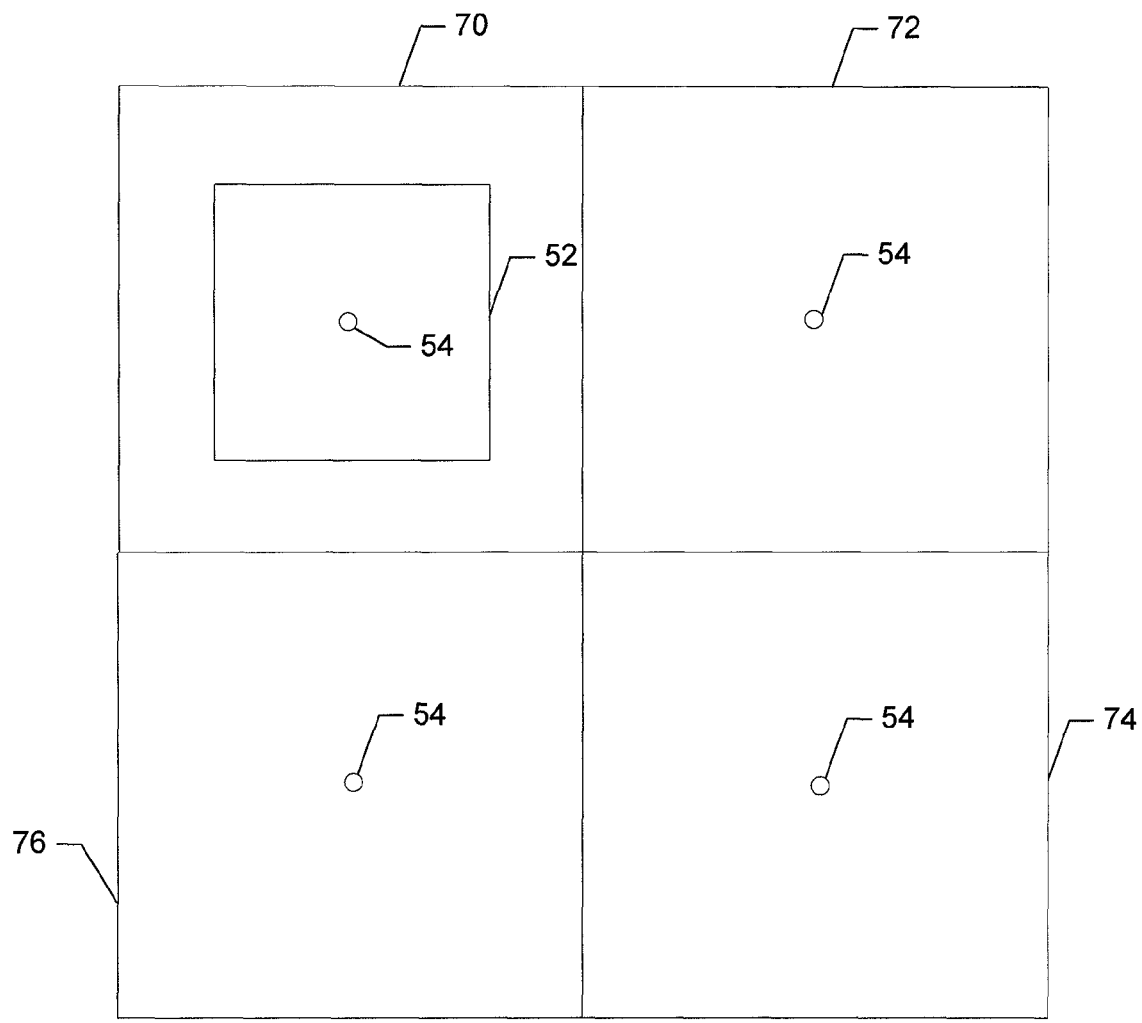
FIG. 5 illustrates an example of defining a viewport upon system startup according to an exemplary embodiment of the present invention.

FIGS. 5-12 illustrate examples of displaying a video image in relative motion true trails mode, rotating the image and offsetting the video center according to an exemplary embodiment of the present invention. In this regard, FIG. 5 illustrates an example of startup operation of an embodiment of the present invention. On startup, the video center (and the center of the sweep 54) may be centered within the state table 40 and the texture 46. Borders of the texture 46 correspond to borders of the vertex buffers. The viewport 52 may not be rotated so the video will be displayed in a North up orientation (e.g., because the state table may be assumed to be maintained North up as the fixed orientation in this example). There is also initially no wrapping of the texture 46 in FIG. 5.

Figure 6:
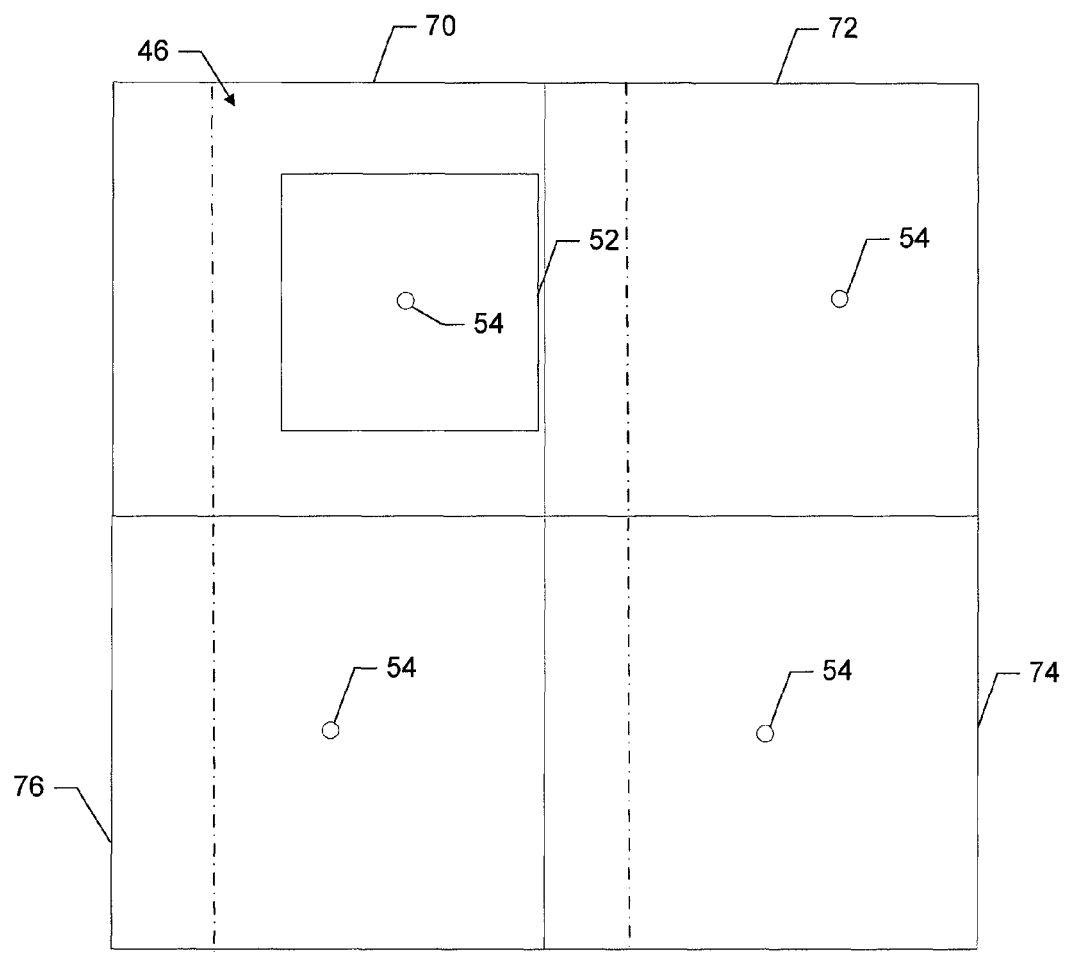
FIG. 6 illustrates a response of the system to motion of a unit employing an embodiment of the present invention according to an exemplary embodiment of the present invention.
Figure 7:
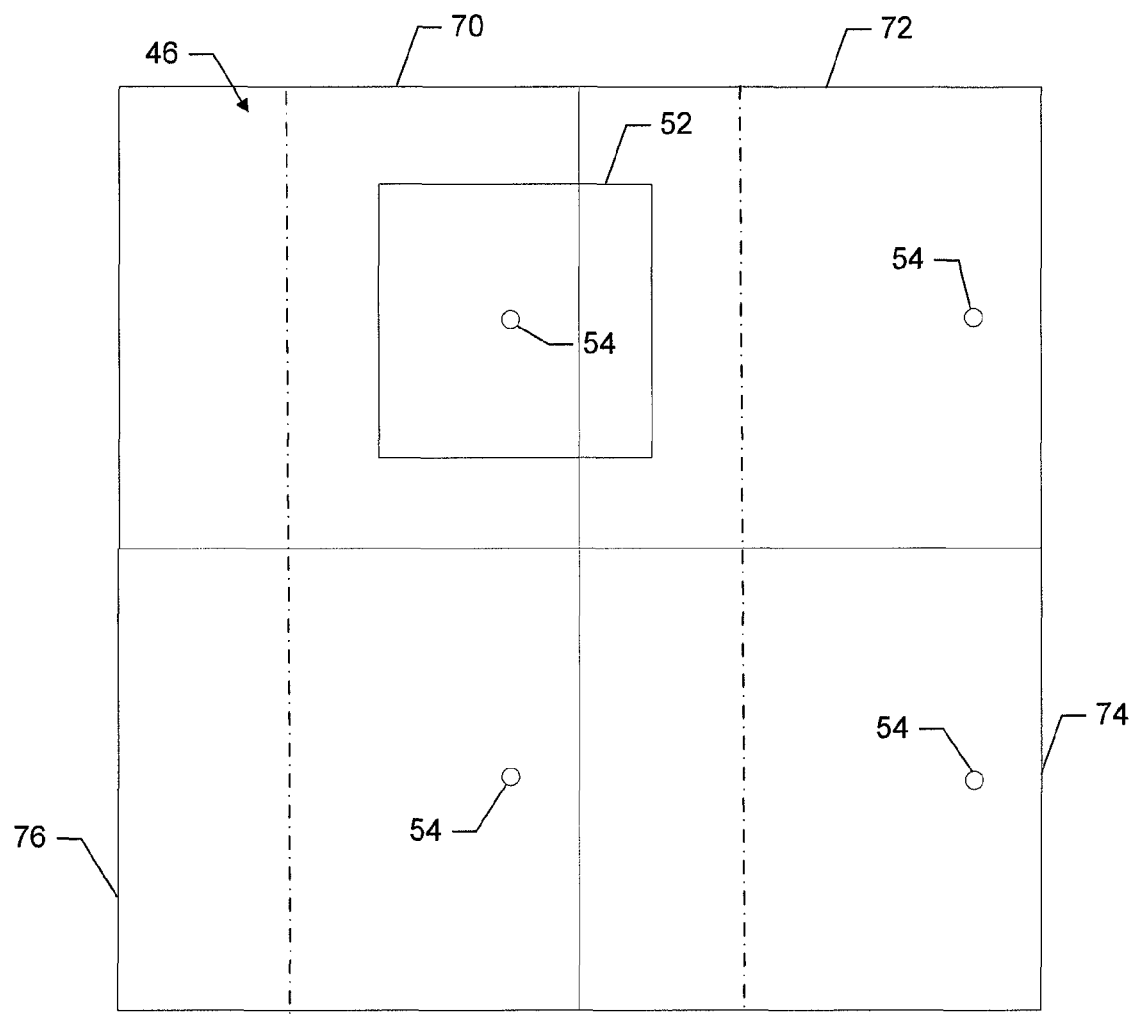
FIG. 7 illustrates a response of the system showing an example in which the viewport crosses a boundary between adjacent vertex buffers according to an exemplary embodiment of the present invention.
Figure 8:
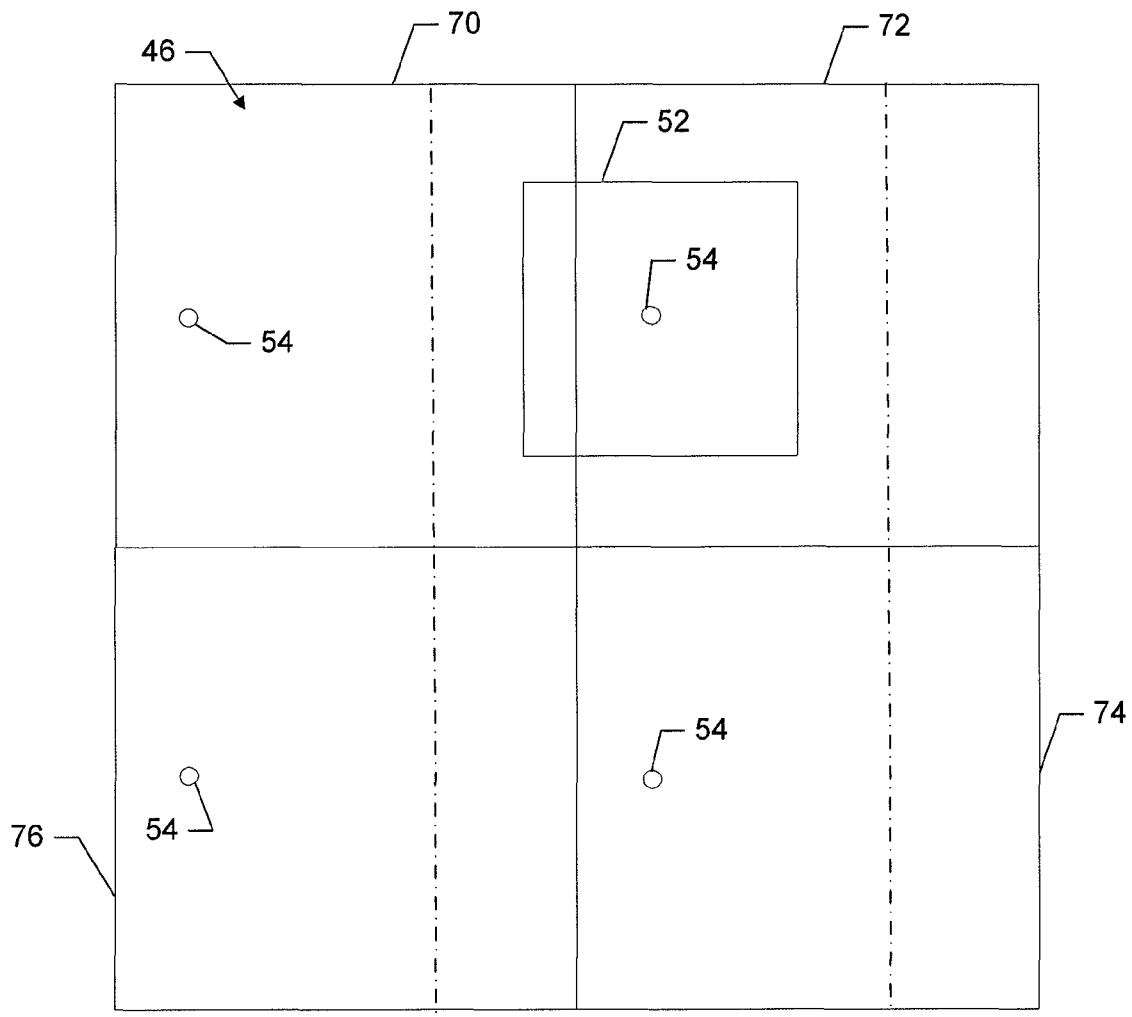
FIG. 8 illustrates a response of the system to motion of the unit to an adjacent vertex buffer according to an exemplary embodiment of the present invention.

As the ship moves across the ground plane to the East, the video center moves to the right and video stored in the state table begins wrapping as shown in FIG. 6. As shown in FIG. 7, if the ship moves further to the East, the viewport 52 may eventually span both the first and second vertex buffers 70 and 72. In FIG. 8, following yet further movement to the East, the video center (and the center of the sweep 54) moves into the second vertex buffer 72 and the texture 46 is still wrapped with respect to each of the vertex buffers.

Figure 9:
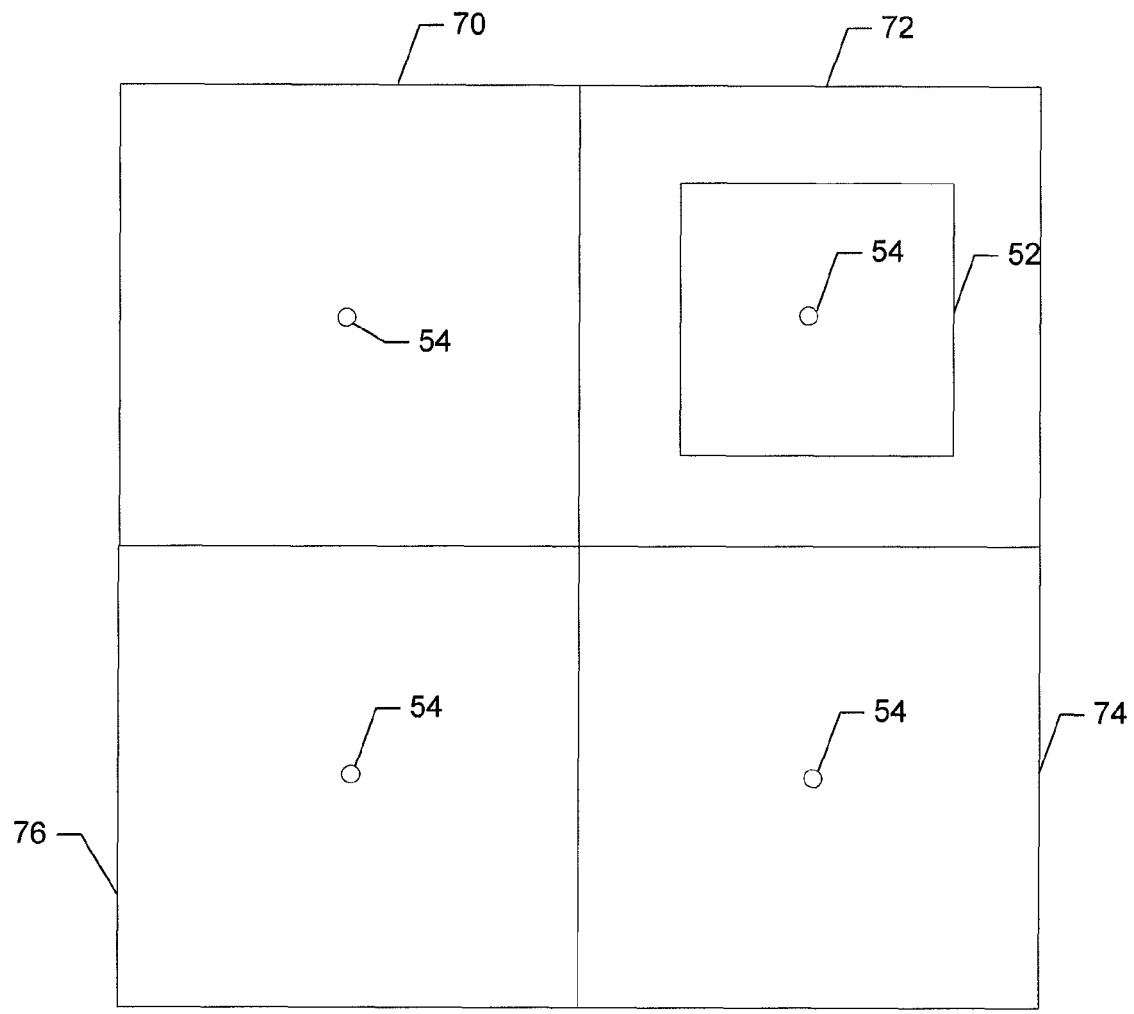
FIG. 9 illustrates a response of the system to motion of the unit to a center of an adjacent vertex buffer according to an exemplary embodiment of the present invention.

In FIG. 9 the viewport 52 is now centered completely within the second vertex buffer 72 and the edges of the texture 46 correspond to edges of the second vertex buffer 72. At this point, in an exemplary embodiment, the viewport 52 may be shifted back within the first vertex buffer 70. However, no such shift is necessary. Furthermore, unless the viewport 52 would extend beyond a boundary of the vertex buffer matrix, the choice of which vertex buffer in which to place the viewport 52 is not important. However, in an exemplary embodiment, when the viewport 52 spans an edge of a vertex buffer, the viewport 52 must be placed so it spans only vertex buffer edges that are common to more than one vertex buffer.

Figure 10:
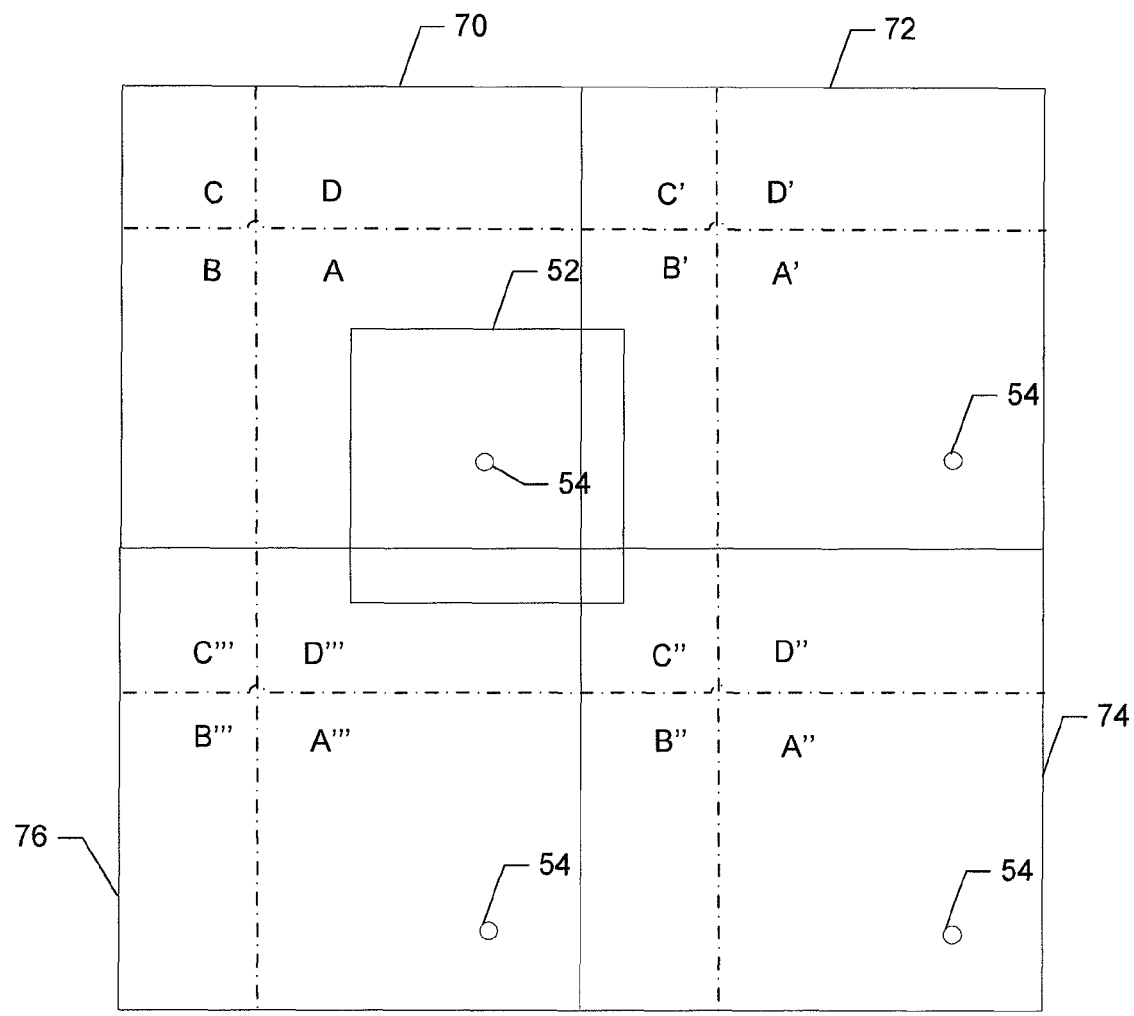
FIG. 10 illustrates an example in which the viewport crosses a boundary between each adjacent vertex buffer according to an exemplary embodiment of the present invention.
Figure 11:
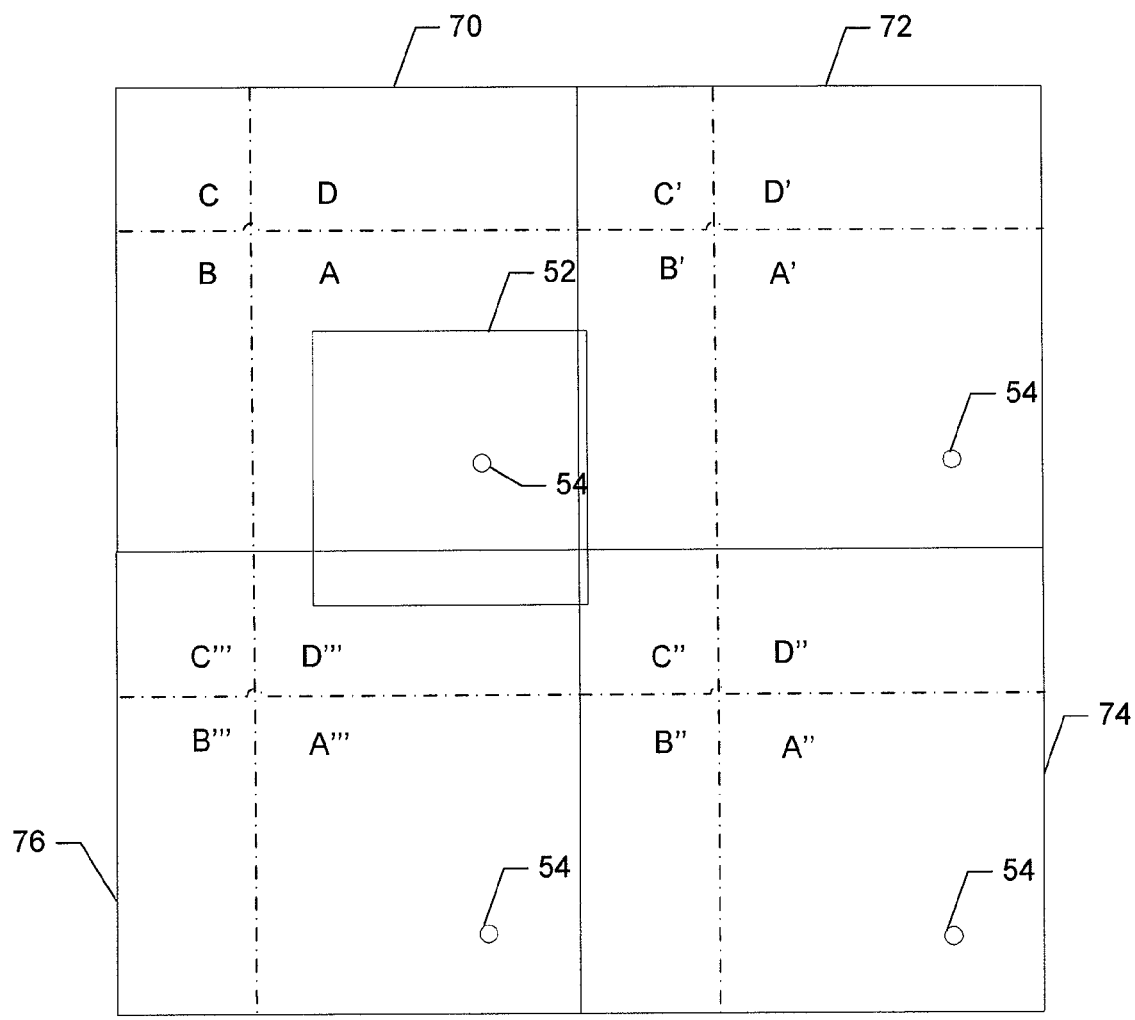
FIG. 11 illustrates an example in which the viewport of FIG. 10 is offset according to an exemplary embodiment of the present invention.
Figure 12:
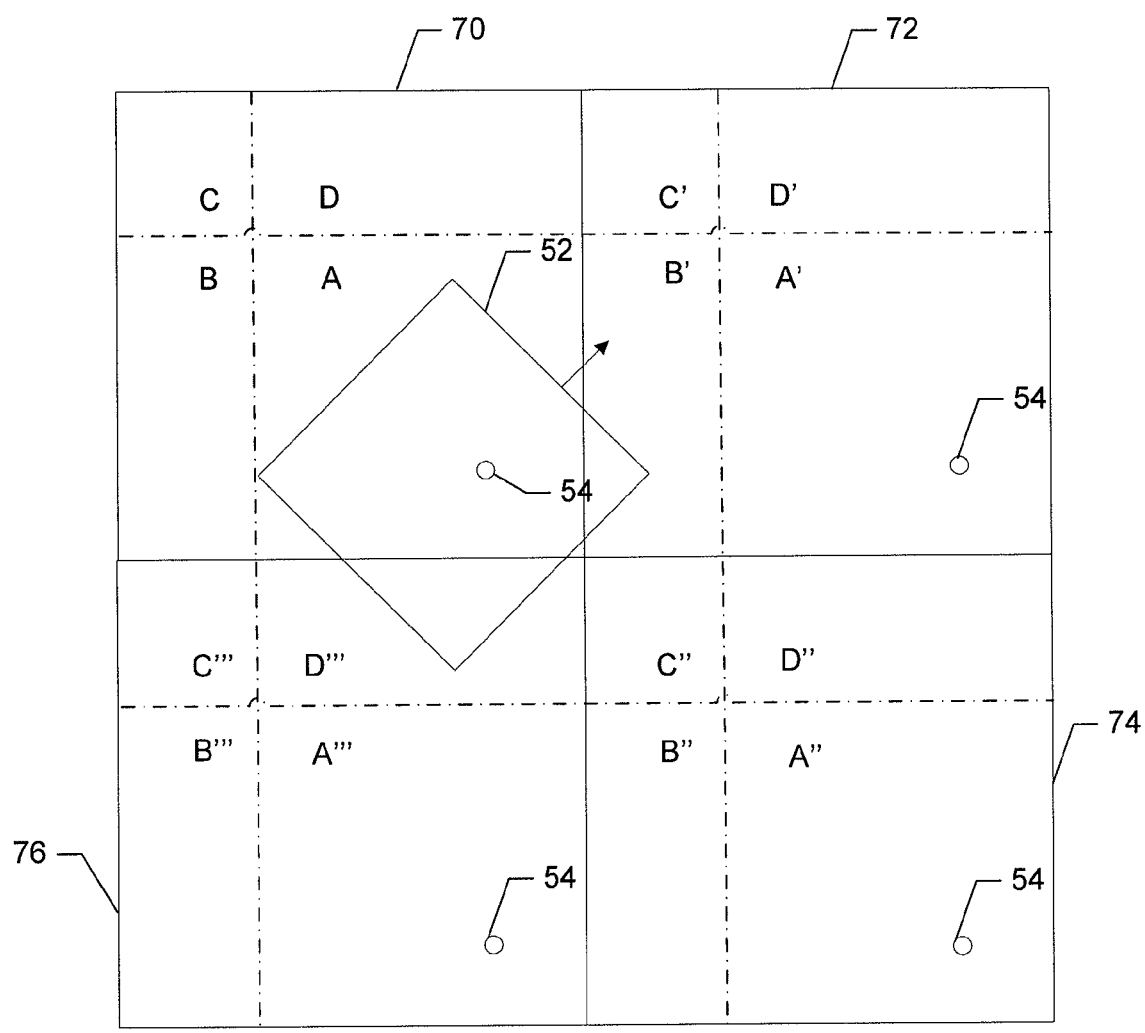
FIG. 12 illustrates an example in which an orientation of the viewport of FIG. 11 is changed according to an exemplary embodiment of the present invention.

In FIG. 10, the ship has moved East and South so that the viewport 52 extends into all four vertex buffers. The viewport 52 may then be offset as shown in FIG. 11 by moving the center of the viewport 52) so that the center of the viewport 52 does not correspond to the position of the center of the sweep 54. As shown in FIG. 12, the viewport 52 may be rotated about the center of the viewport 52 in order to change the orientation of the viewport 52 and consequently also change the orientation of the image rendered at the display 20. In the example shown in FIG. 12, the rotation of the viewport 52 is about 45 degrees in order to match the heading of the ship, which is indicated by an arrow.

In an exemplary embodiment, movement of the viewport 52 to generate a desired motion mode (i.e., true motion or relative motion) may be combined with a selected trail mode (true trails or relative trails) to provide various motion/trail modes. In this regard, for example, one motion/trail mode may be referred to as a relative motion true trails mode (RM (T)). In RM(T), the video center may be held stationary on the display and trails may be indicative of an object's motion over the ground based on returns from the object. In another mode, true motion true trails or TM(T), the video center may move across the display representing the motion of the origin of the return (or the center of the sweep 54) over the ground plane and the trails may be indicative of an object's motion over the ground. Meanwhile, in relative motion relative trails or RM(R) mode, the video center may be stationary on the display 20 and the trails may be indicative of the object's motion relative to the center of the sweep. In true motion relative trails or TM(R) mode, the video center may move across the display representing the motion of the center of the sweep over the ground plane and the trails may be indicative of the object's motion relative to the center of the sweep.

The generation of true trails requires the state table to map to the ground plane so the video center may move through the state table proportional to the motion of the center of the sweep over the ground. To generate the RM(T) effect, the viewport 52 may move with the motion of the center of the sweep 54 to keep the video center stationary on the display 20. To generate the TM(T) effect, the viewport 52 may be simply left stationary. The generation of relative trails may require the state table to map to a plane that moves (but does not rotate) with the motion of the center of the sweep. When generating relative trails, the position of the center of the sweep 54 may be stationary within the state table. Accordingly, to generate the RM(R) effect, the viewport 52 can be simply left stationary. To generate the TM(R) effect the viewport 52 may be moved in a direction opposite to the motion of the center of the sweep relative to the ground plane.

Accordingly, embodiments of the invention may include the performance of radar video processing that is typically performed by dedicated hardware to be decomposed so that rotational and translational operations may be implemented in software by the GPU. Additionally, since the orientation of the image is not dependent upon the orientation of the state table, there is no need to clear the state table to re-orient the image and/or to manually offset the image. Thus, trail and buildup information may be maintained since orientation changes may be accomplished by merely rotating the viewport 52. Additionally, the motion mode effect (true motion versus relative motion) may be generated by appropriately moving the viewport 52 to achieve the corresponding motion mode effect. Thus, improved image quality may be presented since true trail video generation may be provided in relative motion without artifacts and true motion relative trails may be provided without the artifacts described above for relative motion true trails.

Figure 13:
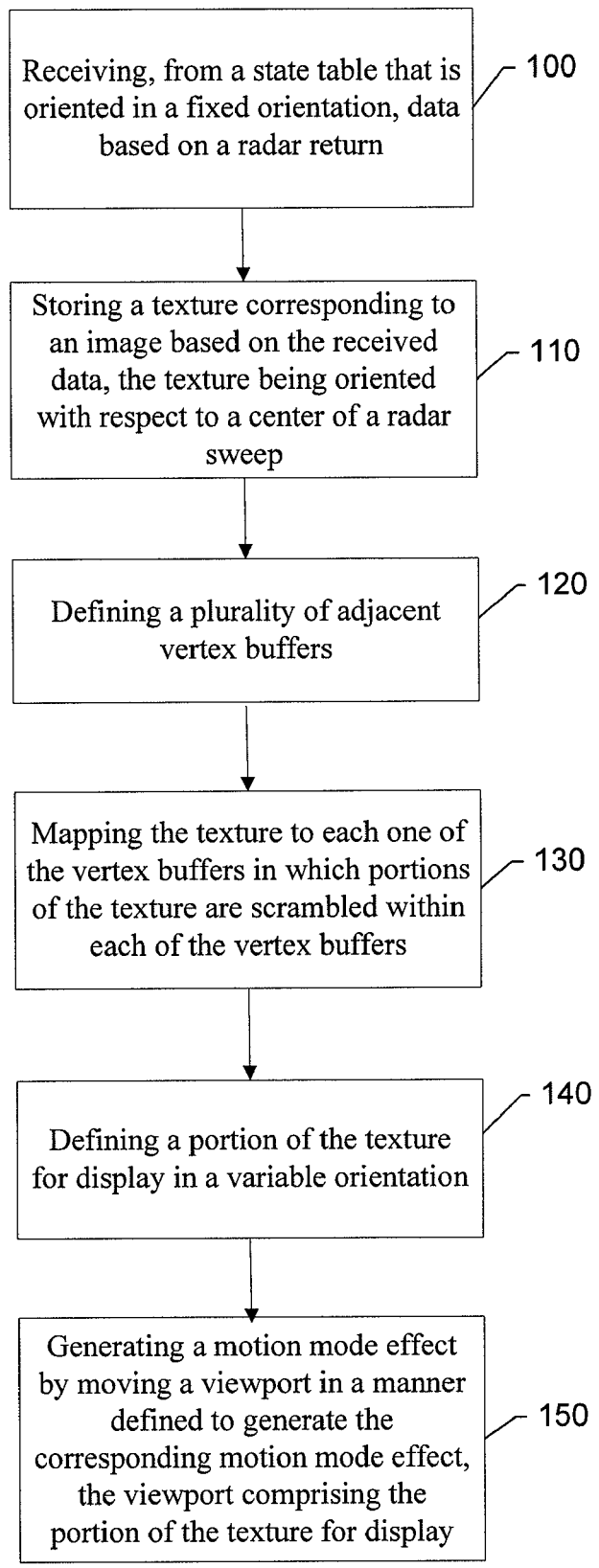
FIG. 13 is a flowchart of a method for providing enhanced radar video processing according to an exemplary embodiment of the present invention.

FIG. 13 is a flowchart of a method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a radar system and executed by a processor in radar system. The computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing an enhanced radar video processing may receive, from a state table that is oriented in a fixed orientation, data based on a radar return at operation 100. A texture corresponding to an image based on the received data may be stored at operation 110. The texture may be centered on oriented with respect to a center of a radar sweep. At operation 120, a plurality of adjacent vertex buffers may be defined. In an exemplary embodiment, the vertex buffers may be arranged in a matrix and each vertex buffer may be of an equal size to a size of the texture. Each of the vertex buffers may also have a defined position coordinate structure relative to a real world surface. The texture may be mapped to each one of the vertex buffers (or at least one of the vertex buffers) in which portions of the texture are scrambled within each of the vertex buffers (or the at least one of the vertex buffers) at operation 130. In an exemplary embodiment, the method may further include defining a portion of the texture for display in a variable orientation at operation 140 and generating a motion mode effect by moving a viewport in a manner defined to generate the corresponding motion mode effect at operation 150. The viewport may include the portion of the texture for display. The viewport may be offset from the center of the radar sweep and may be defined to be capable of displaying texture data corresponding to more than one of the vertex buffers at any given time. In other words, the viewport may be defined such that, when texture data corresponding to more than one of the vertex buffers is displayed or otherwise within the viewport, the corresponding texture data is unscrambled.

In an exemplary embodiment, storing the texture may include storing trail and/or buildup data corresponding to radar returns from at least one object and defining the portion of the texture for display may include defining a viewport that, in response to variation of the orientation of the viewport, instantaneously includes the trail data adjusted to account for the variation of the orientation of the viewport. In another exemplary embodiment, mapping the texture may include mapping at least a first wrapped portion and a second wrapped portion of the texture in a first vertex buffer and mapping a third wrapped portion, corresponding to the first wrapped portion, and a fourth wrapped portion, corresponding to the second wrapped portion, in a second vertex buffer that is adjacent to the first vertex buffer such that the first wrapped portion and the fourth wrapped portion form a portion of an unwrapped texture extending over a boundary between the first and second vertex buffers.

Thus, conceptually at least, an embodiment of the present invention may be thought to present a repeat of a "scrambled" video image multiple times in a matrix (e.g., four times in a two-by-two matrix). A viewport may then be defined that may span the adjacent edges of the repeated image to "unscramble," rotate, and/or offset the video for display.

The above described functions may be carried out in many ways. For example, any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for processing radar video, the method comprising:
   receiving, from a state table that is oriented in a fixed orientation, data based on a radar return;
   storing a texture corresponding to an image based on the received data, the texture being oriented with respect to a center of a radar sweep;
   defining a plurality of adjacent vertex buffers in a matrix, wherein each of the vertex buffers defines an equal size, wherein the size of each of the vertex buffers is equal to a size defining the texture;
   mapping the texture to a first vertex buffer by mapping at least a first wrapped portion and a second wrapped portion of the texture to the first vertex buffer, wherein at least a portion of the texture mapped to the first vertex buffer is scrambled; and
   mapping the texture to at least one second vertex buffer by mapping a third wrapped portion, corresponding to the first wrapped portion, and a fourth wrapped portion, corresponding to the second wrapped portion, to a second vertex buffer that is adjacent to the first vertex buffer such that the first wrapped portion and the fourth wrapped portion form a portion of an unwrapped texture extending over a boundary between the first and second vertex buffers.

2. The method of claim 1, further comprising defining a portion of the texture for display in a variable orientation.

3. The method of claim 2, wherein defining the portion of the texture for display comprises defining a viewport that is offset from the center of the radar sweep.

4. The method of claim 2, wherein storing the texture comprises storing the texture including trail or buildup data corresponding to radar returns from at least one object and wherein defining the portion of the texture for display comprises defining a viewport that, in response to variation of the orientation of the viewport, instantaneously includes the trail data adjusted to account for the variation of the orientation of the viewport.

5. The method of claim 2, wherein defining the portion of the texture for display comprises defining a viewport that is capable of displaying texture data from more than one of the vertex buffers at any given time.

6. The method of claim 2, further comprising generating a motion mode effect by moving a viewport in a manner defined to generate the corresponding motion mode effect, the viewport comprising the portion of the texture for display.

7. The method of claim 1, wherein defining the plurality of vertex buffers comprises defining each of the vertex buffers to have a defined position coordinate structure relative to a real world surface.

8. The method of claim 1 further comprising defining a viewpoint across at least a portion of the first vertex buffer and at least a portion of the at least one second vertex buffer, wherein the viewpoint defines a texture that is unscrambled.

9. The method of claim 8, wherein defining the viewpoint comprises defining the viewpoint for display such that an unscrambled texture is defined for display.

10. A computer program product for processing radar video, the computer program product comprising at least one non-transitory computer-readable storage medium having computer-readable program code portions stored therein, the computer-readable program code portions being configured to:
receive, from a state table that is oriented in a fixed orientation, data based on a radar return;
store a texture corresponding to an image based on the received data, the texture being oriented with respect to a center of a radar sweep;
define a plurality of adjacent vertex buffers in a matrix, wherein each of the vertex buffers defines an equal size, wherein the size of each of the vertex buffers is equal to a size defining the texture;
map the texture to a first vertex buffer by mapping at least a first wrapped portion and a second wrapped portion of the texture to the first vertex buffer, wherein at least a portion of the texture mapped to the first vertex buffer is scrambled within at least one of the vertex buffers; and
map the texture to at least one second vertex buffer by mapping a third wrapped portion, corresponding to the first wrapped portion, and a fourth wrapped portion, corresponding to the second wrapped portion, to a second vertex buffer that is adjacent to the first vertex buffer such that the first wrapped portion and the fourth wrapped portion form a portion of an unwrapped texture extending over a boundary between the first and second vertex buffers.

11. The computer program product of claim 10, wherein the computer-readable program code portions are further configured to define a portion of the texture for display in a variable orientation.

12. The computer program product of claim 11, wherein the computer-readable program code portions are further configured to define a portion of the texture for display by defining a viewport that is offset from the center of the radar sweep.

13. The computer program product of claim 11, wherein the computer-readable program code portions are further configured to store the texture by storing trail or buildup data corresponding to radar returns from at least one object, and wherein the computer-readable program code portions are further configured to define a portion of the texture for display by defining a viewport that, in response to variation of the orientation of the viewport, instantaneously includes the trail data adjusted to account for the variation of the orientation of the viewport.

14. The computer program product of claim 11, wherein the computer-readable program code portions are further configured to define a portion of the texture for display by defining a viewport that is capable of displaying texture data from more than one of the vertex buffers at any given time.

15. The computer program product of claim 11, wherein the computer-readable program code portions are further configured to generate a motion mode effect by moving a viewport in a manner defined to generate the corresponding motion mode effect, the viewport comprising the portion of the texture for display.

16. An apparatus for processing radar video, the apparatus comprising a processing element configured to:
receive, from a state table that is oriented in a fixed orientation, data based on a radar return;
store a texture corresponding to an image based on the received data, the texture being oriented with respect to a center of a radar sweep;
define a plurality of adjacent vertex buffers in a matrix, wherein each of the vertex buffers defines an equal size, wherein the size of each of the vertex buffers is equal to a size defining the texture;
map the texture to a first vertex buffer by mapping at least a first wrapped portion and a second wrapped portion of the texture to the first vertex buffer, wherein at least a portion of the texture mapped to the first vertex buffer is scrambled; and
map the texture to at least one second vertex buffer by mapping a third wrapped portion, corresponding to the first wrapped portion, and a fourth wrapped portion, corresponding to the second wrapped portion, to a second vertex buffer that is adjacent to the first vertex buffer such that the first wrapped portion and the fourth wrapped portion form a portion of an unwrapped texture extending over a boundary between the first and second vertex buffers.

17. The apparatus of claim 16, wherein the processing element is further configured to define a portion of the texture for display in a variable orientation.

18. The apparatus of claim 17, w wherein the processing element is further configured to define a viewport that is offset from the center of the radar sweep.

19. The apparatus of claim 17, wherein the processing element is further configured to store the texture including trail or buildup data corresponding to radar returns from at least one object and to define the portion of the texture for display comprises defining a viewport that, in response to variation of the orientation of the viewport, instantaneously includes the trail data adjusted to account for the variation of the orientation of the viewport.

20. The apparatus of claim 17, wherein the processing element is further configured to define a viewport that is capable of displaying texture data from more than one of the vertex buffers at any given time.

21. The apparatus of claim 17, wherein the processing element is further configured to generate a motion mode effect by moving a viewport in a manner defined to generate the corresponding motion mode effect, the viewport comprising the portion of the texture for display.

* * * * *

UNITED STATES PATENT AND TRADEMARK OFFICE
CERTIFICATE OF CORRECTION

| | |
|---|---|
| PATENT NO. | : 8,289,339 B2 |
| APPLICATION NO. | : 12/116042 |
| DATED | : October 16, 2012 |
| INVENTOR(S) | : Wall et al. |

It is certified that error appears in the above-identified patent and that said Letters Patent is hereby corrected as shown below:

In the Claims

<u>Column 14,</u>
Line 59, "w wherein the processing" should read --wherein the processing--.

Signed and Sealed this
Fourth Day of June, 2013

Teresa Stanek Rea
*Acting Director of the United States Patent and Trademark Office*